United States Patent [19]

Shefford

[11] Patent Number: 4,503,103
[45] Date of Patent: * Mar. 5, 1985

[54] ENCLOSURE MEMBER CONSISTING ESSENTIALLY OF SOLID, NON-AROMATIC POLYMERS

[75] Inventor: Roger A. Shefford, Aldershot, England

[73] Assignee: Koninklijke Emballage Industrie Van Leer B.V., Amstelveen, Netherlands

[*] Notice: The portion of the term of this patent subsequent to Feb. 1, 2000 has been disclaimed.

[21] Appl. No.: 529,947

[22] Filed: Sep. 7, 1983

[30] Foreign Application Priority Data

Sep. 7, 1982 [GB] United Kingdom ............... 8225441

[51] Int. Cl.$^3$ .................. B05D 3/00; B65D 23/00
[52] U.S. Cl. ................................ 428/35; 215/1 C; 215/12 R; 428/339; 428/516; 428/520; 427/322
[58] Field of Search ............... 428/35, 339, 516, 526; 427/322, 393.5; 215/1 C, 12 R

[56] References Cited

U.S. PATENT DOCUMENTS 2,786,780  3/1957  Walles et al. .................. 428/516
4,371,574  2/1983  Shefford ........................... 428/35

Primary Examiner—Michael R. Lusignan
Attorney, Agent, or Firm—Brumbaugh, Graves, Donohue & Raymond

[57] ABSTRACT

The present invention relates to an enclosure member consisting essentially of solid, non-aromatic polymers that have a linear carbon to carbon backbone structure and have a plurality of free hydrogen atoms attached to the carbon atoms with a permeability to wet and dry solvents and fuels of less than 1/50, of the permeability of untreated enclosure members having a thickness of 1 mm, a portion of the hydrogen atoms of the surfaces of said member having been replaced by sulphonic acid or sulphonate groups and being coated with a cured thin layer of a mixture of a resin made by the reaction of urea and formaldehyde, respectively of melamine and formaldehyde, with furfuryl alcohol, and an oligomer consisting of a polymer of furfuryl alcohol and formaldehyde.

5 Claims, 8 Drawing Figures

PERMEABILITY OF POLYETHYLENE BOTTLES TO XYLENE AT 20°C

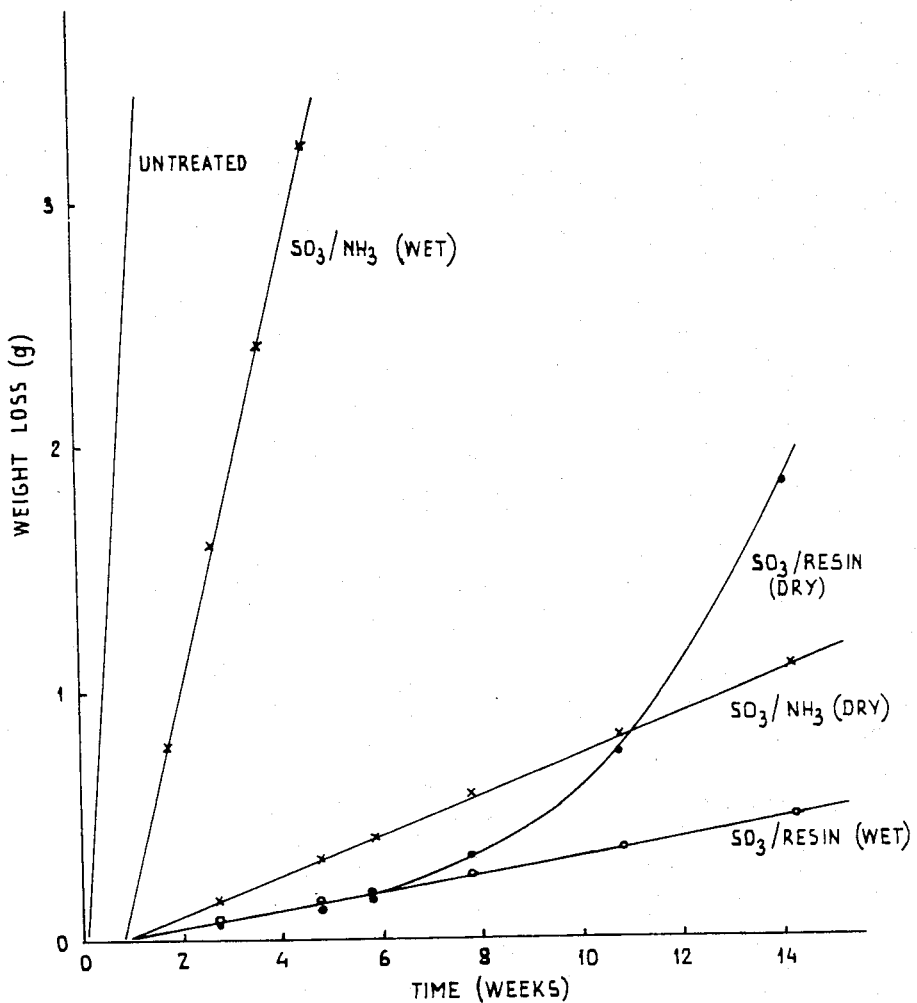

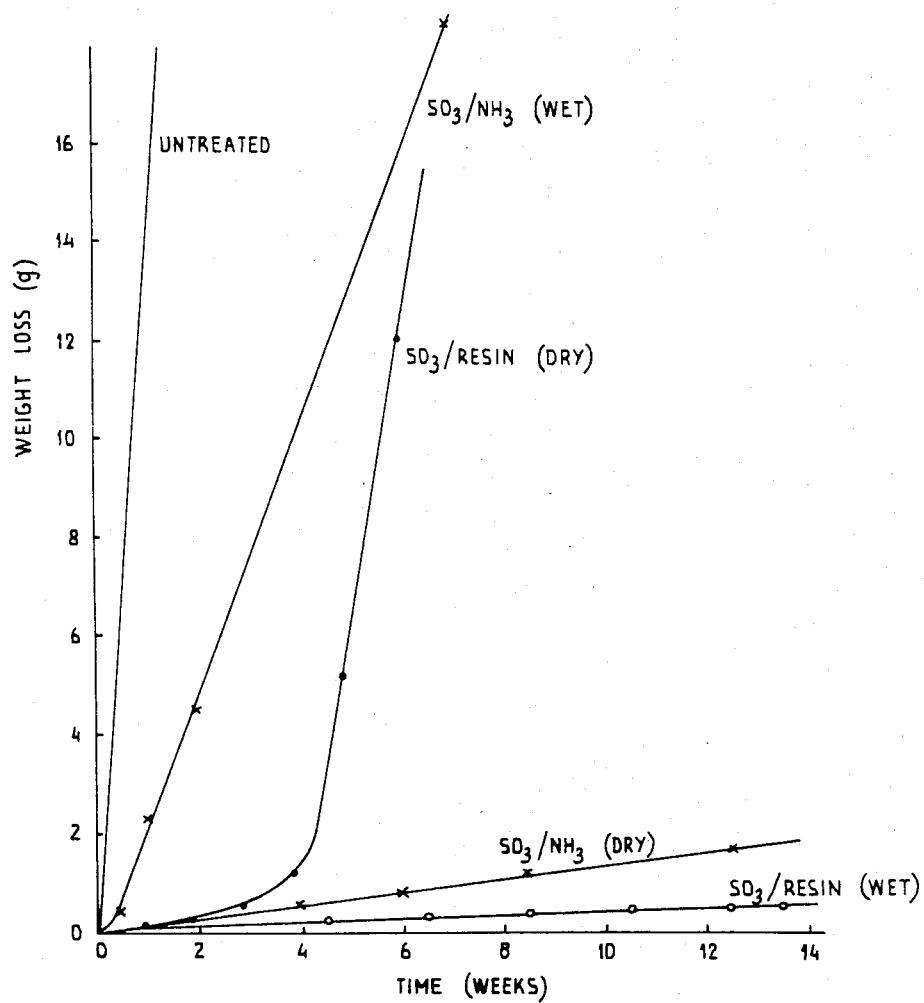

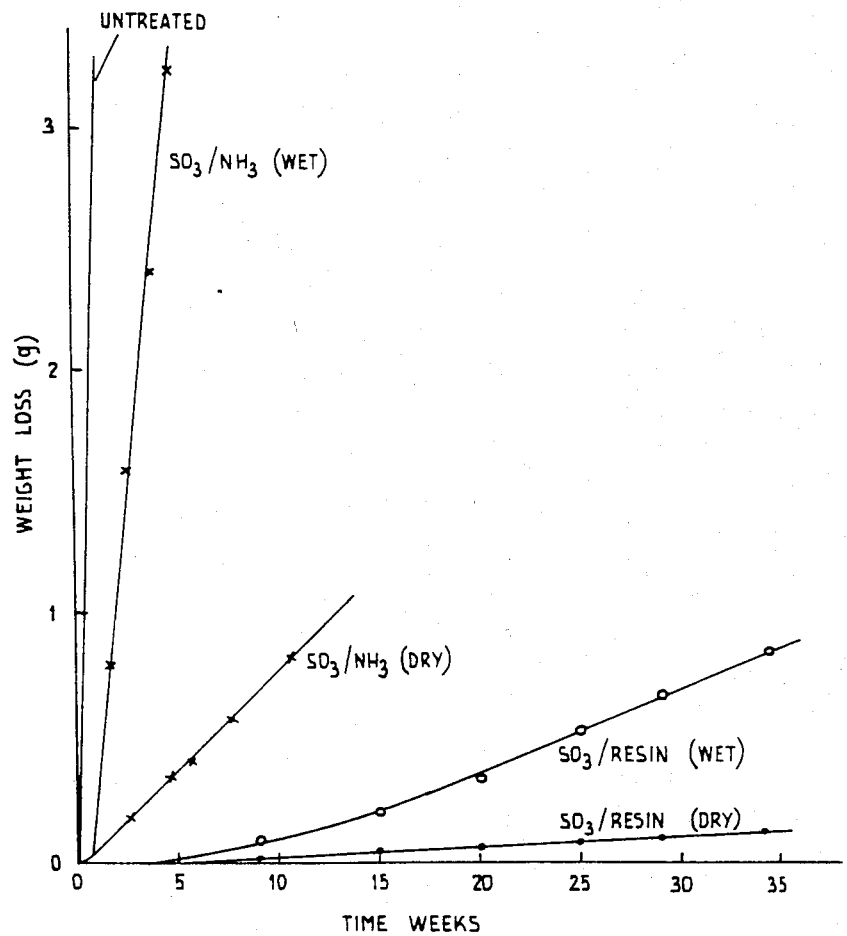

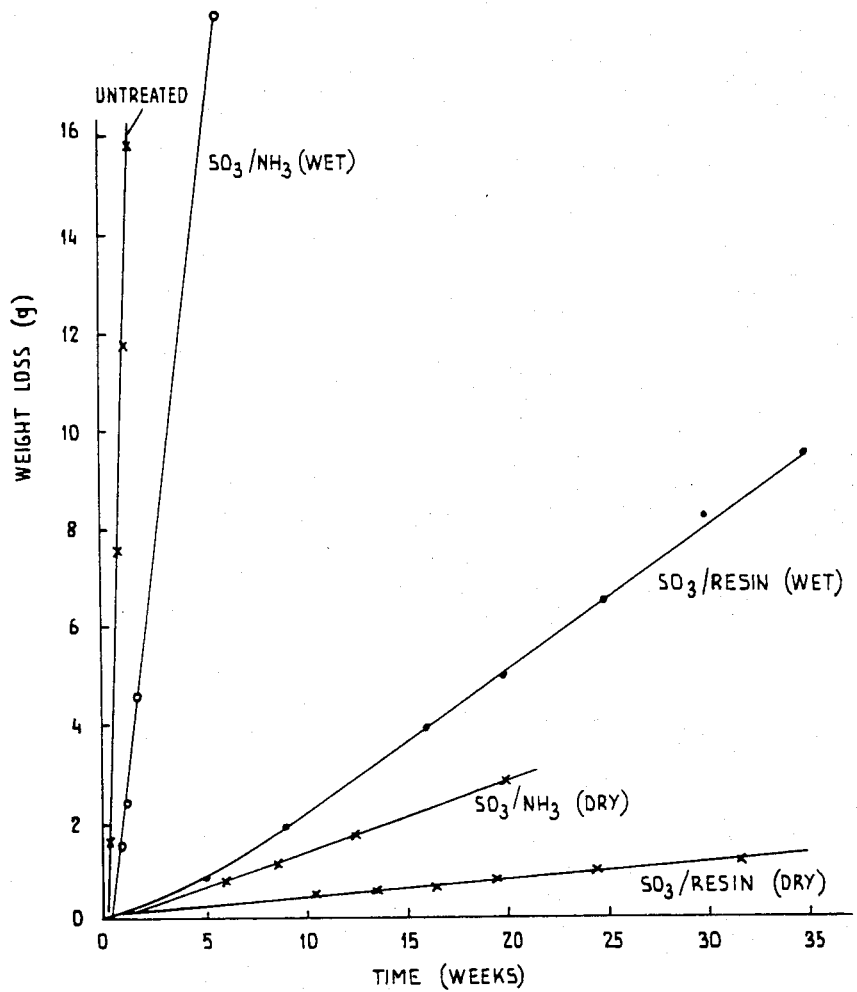

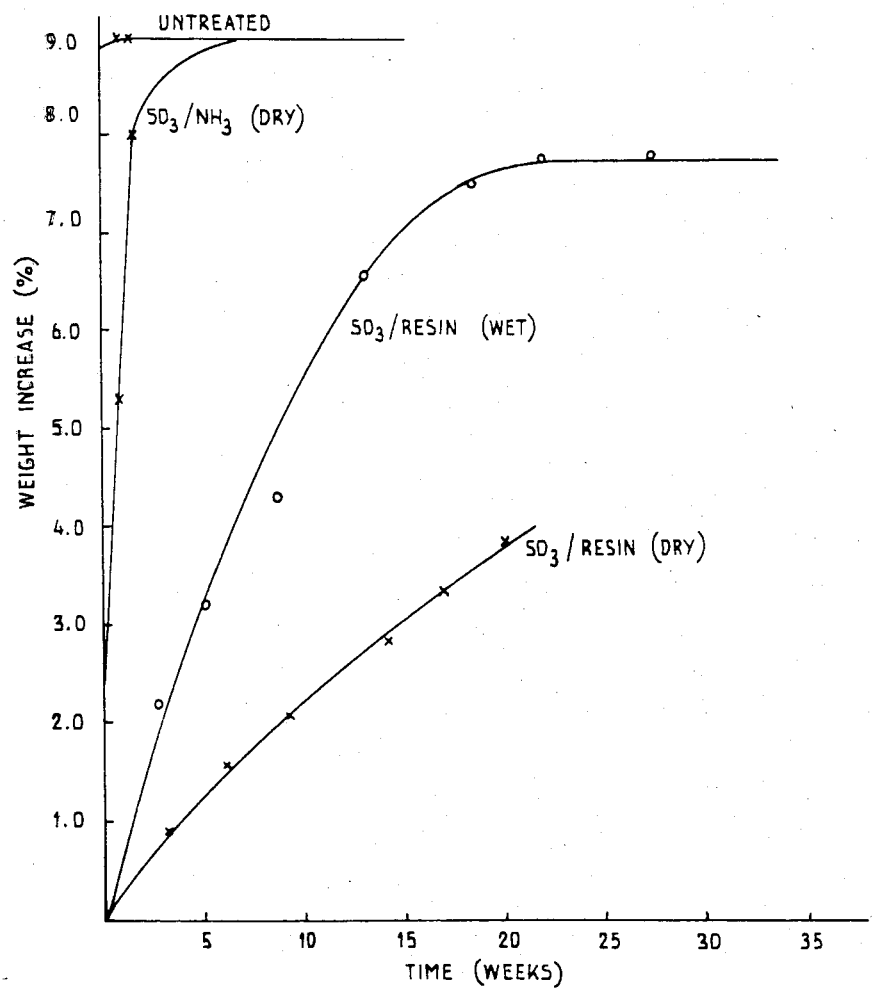

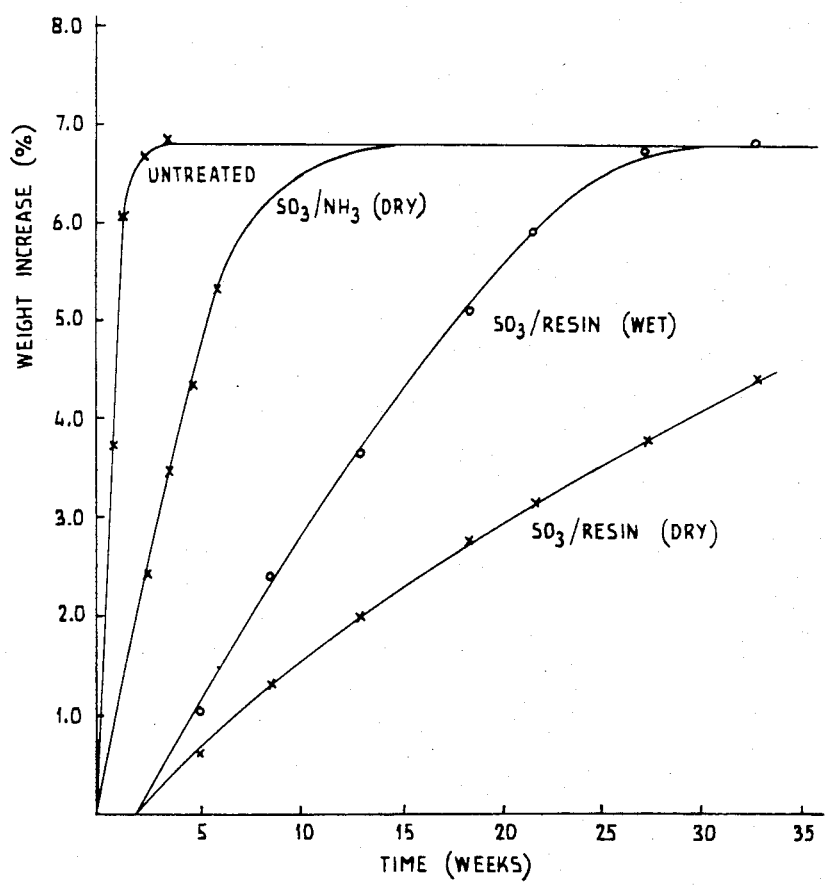

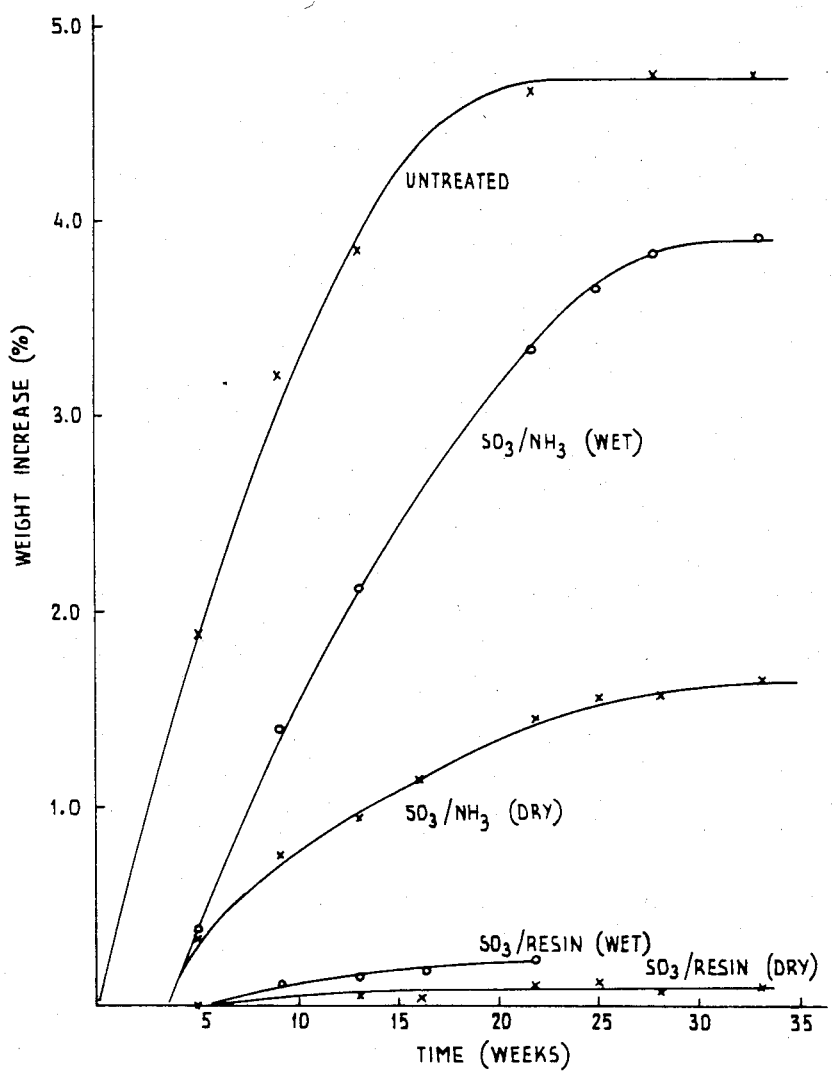

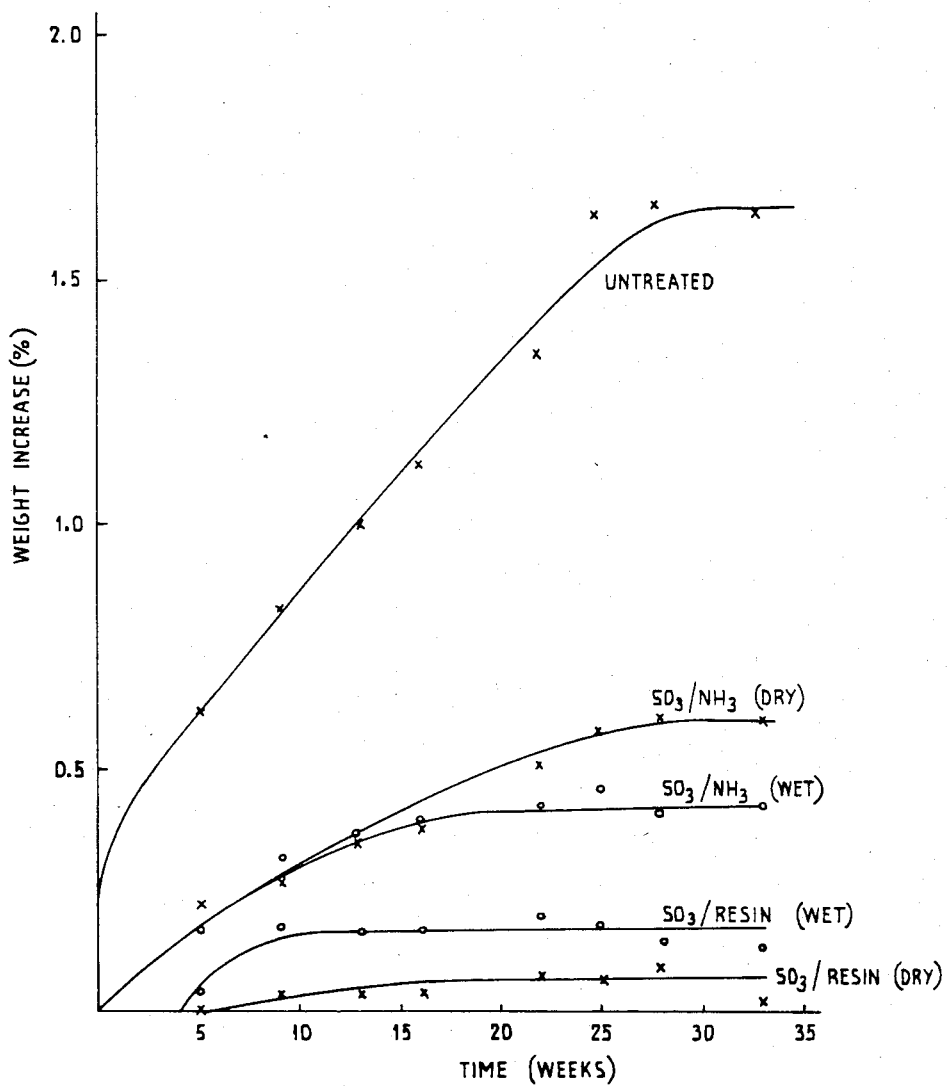

ENCLOSURE MEMBER CONSISTING ESSENTIALLY OF SOLID, NON-AROMATIC POLYMERS

The present invention relates to an enclosure member consisting essentially of solid non-aromatic polymers that have a linear carbon to carbon backbone structure and have a plurality of free hydrogen atoms attached to the carbon atoms with a permeability to wet and dry solvents and fuels of less than 1/50, optimally less than 1/200, of the permeability of untreated enclosure members having a thickness of 1 mm, the enclosure having an inner and outer surface having a portion of the hydrogen atoms replaced by sulphonic acid or sulphonate groups and being coated with a cured thin (of at lest 2 μm) layer of resin.

In European patent application No. 81.200149(3) it is disclosed that the permeability of enclosure members—e.g. drums—consisting essentially of solid, non-aromatic polymers that have a plurality of free hydrogen atoms attached to the carbon atoms—particularly polyethylene—to organic solvents, even when wet with water, may be reduced considerably by replacing a proportion of the hydrogen atoms at least one major surface thereof with sulphonic acid groups by reaction with sulphur trioxide and coating this surface with a thin layer of resin consisting essentially of a condensation product of either formaldehyde and urea or formaldehyde and melamine. However long term tests revealed that sometimes said coatings tend to crack in dry organic solvents and consequently the barrier properties are destroyed. Said destruction of the barrier properties is accelerated at increased temperatures. Close examination of the cracks formed revealed that the crack is initiated in the resin but propagates through the sulphonated layer into the polyethylene which renders it as permeable to organic solvents as untreated polyethylene.

Thus, the first object of this invention is to provide a solution for the above problem.

The second object is to reduce the absorption of the enclosure members to organic solvents and oils.

The third object is to provide a treatment for the said enclosure members such that after they have been cleaned they can be reused as nearly new containers.

It was found that the said objects may be achieved by treating the surface of the enclosure member with sulphur trioxide, removing excess sulphur trioxide with a stream of dry air followed by washing with water, as described above, and coating with a layer of a mixture of 90 and 0 weight % of a resin made by the reaction of urea and formaldehyde in a molar ratio of from 1:1,1 to 1:1.7 respectively of melamine and formaldehyde in a molar ratio of from 1:1.2 to 1:4.0, with 10 to 70 weight % of furfuryl alcohol added during the reaction and 10–100 weight % of an oligomer consisting of a polymer of furfuryl alcohol and 0 to 100 mole %—calculated on the furfuryl alcohol—of formaldehyde with a degree of polymerisation between 1 and 10.

The resin is conveniently dried by heating the container for a few minutes at about 80° C.

The modified amino resin from urea and formaldehyde is preferably prepared in a molar ratio of from 1:1.2 to 1:1.5. In case the modified amino resin is prepared from melamine and formaldehyde the molar ratio is preferably 1:1.5 to 1:3.0. Since the furfuryl alcohol is added during the course of the reaction a substantial part thereof reacts with the resin. The amount of furfuryl alcohol added preferably, is 40 to 50 weight %.

The degree of polymerisation of the polymer of furfuryl alcohol present in the oligomer is preferably 3.

Preferably the mixture of amino resin and oligomer consists of 25 weight % resin and 75 weight % of oligomer.

If said resin mixture is applied as a coating after sulphonation on the above enclosure members the impermeability to wet and dry xylene is satisfactory for long periods of time, even at elevated temperatures.

It will be shown that the treatment described above reduced the rate of absorption by polyethylene of organic solvents and also of liquids which are normally absorbed by polyethylene but are not sufficiently volatile to actually permeate through polyethylene e.g. lubricating oil. Suprisingly not only is the rate of absorption reduced but so is the saturation level.

It was noted that the low absorption is reflected in preventing a change in the Youngs modulus of the polyethylene wall of a drum when it is used for storing xylene or oil.

It will also be shown that as a consequence of reducing the absorption of the contents of a drum by the drum wall, it can be cleaned by conventional drum reconditioning procedures and reused for a different product with a much reduced level of contamination of the second product by the first.

If drums are manufactured by welding injection moulded ends to extruded tube and subsequently treated by sulphonating the surface and neutralising with alkali as in the process according to U.S. Pat. No. 2,786,780 this does not provide an adequate barrier to organic solvents, either dry or wet on the injection moulded ends. Whereas the process described herein does provide such an adequate barrier.

The accompanying drawing illustates as follows:

FIG. 1 is a graph showing permeability of polyethylene bottles to xylene at 20° C.;

FIG. 2 is a graph showing permeability of polyethylene bottles of xylene at 40° C.;

FIG. 3 is a graph showing permeability of polyethylene bottles (using modified resin) to xylene at 20° C.;

FIG. 4 is a graph showing permeability of polyethylene bottles (using modified resins) to xylene at 40° C.;

FIG. 5 is a graph showing absorption of xylene by type b 200 liter drum ends at 40° C.;

FIG. 6 is a graph showing absorption of xylene by type b 200 liter drum ends at 20° C.;

FIG. 7 is a graph showing absorption of oil by type b 200 liter drum ends at 60° C.;

FIG. 8 is a graph showing absorption of oil by type b 200 liter drum ends at 40° C.

In order to elucidate the invention the following examples of tests carried out are described.

COMPARATIVE EXAMPLE

A number of blow moulded polyethylene bottles of 125 ml capacity made from Rigidex ®00255 (density=0.953, mfi2=0.2) were obtained. Two bottles were each first dried by blowing through dry nitrogen. The nitrogen was then passed over hot sulphur trioxide into the bottle for one minute. The bottle was left for two minutes to allow the sulphur trioxide to react with the surface before being blown out with nitrogen. Finally the bottles was washed with water and ammonia gas passed through to neutralise the surface.

A further two bottles were treated with sulphur trioxide as described above but the surface was not neutralised with ammonia. They were thoroughly washed and dried and then filled with a 50 weight % aqueous solution of a urea formaldehyde resin which had had furfuryl alcohol added during the reaction such that the resin contained 35 weight % furfuryl alcohol of which most had reacted with the resin. The resin was poured out and after allowing it to drain the bottles were placed in an oven at 80° C. for five minutes and then cooled.

These four bottles plus an untreated bottle were filled with xylene. One of each type of treated bottle had 1 weight % water added to the xylene (wet). The other two and the untreated control had no water added (dry). The bottles were all sealed with polyethylene coated aluminum foil and weighted. They were stored at 20° C. and weighed at intervals. The weight loss v time was plotted graphically and the result shown in FIG. 1.

It can be seen that, as described in European patent application No. 81.200149.3 the ammonia neutralised samples had a low permeability to dry xylene but high to wet xylene. The sulphonated and resin coated samples initially had a low permeability to both wet and dry xylene. However, after several weeks the permeability to dry xylene started to increase, and after several months it was quite high. At the end of the test period the internal surface of the bottle was examined and found to be cracked as described above.

This test was repeated except that the storage temperature of the bottles was 40° C. The results (FIG. 2) were similar but the permeabilities were, of course, higher and cracking of the resin occured in a much short time period.

EXAMPLE 1

5 bottles were treated as described in the comparative example except that the resin was replaced by a mixture of the resin described and an oligomer which as a co-polymer of furfuryl alcohol and formaldehyde with a degree of polymerisation of about 3. The composition of the mixture was as follows:

| Resin | 25 weight % |
| Oligomer | 75 weight % |
| Ethanol | 50 weight % |
| Water | 25 weight % |

The tests were carried out as described in the comparative example at 20° C. and repeated at 40° C. with the results shown in FIGS. 3 and 4 respectively. It is obvious that the results are similar except that the sulphonated and resin coated samples retain their low permeability for a very long time even at 40° C. Similar bottles which had not been sulphonated but which were coated with resin as above had a much higher permeability than those which had been sulphonated and resin coated.

EXAMPLE 2

To demonstrate that the invention is not restricted to the particular mixture described in example 1 but can be used with a range of resin mixtures several of these mixtures were made up from the following components:
Resin 1—A urea formaldehyde resin with furfuryl alcohol added during the reaction such that the resin contained 37 weight % furfuryl alcohol of which most had reacted with the resin. The viscosity of the resin was 35 cp.

Resin 2—A urea formaldehyde resin with furfuryl alcohol added during the reaction such that the resin contained 44 weight % furfuryl alcohol of which most had reacted with the resin. The viscosity of the resin was 50 cp.

Oligomer A—A furfuryl alcohol/formaldehyde copolymer with approximately equal molar quantities of each monomer and a mean degree of polymersation of 3.

Oligomer B—A furfuryl alcohol homopolymer with a mean degree of polymerisation of 3.

Furfuryl alcohol monomer. (Degree of polymerisation = 1).

In the mixtures used Resin 1 was dissolved in water (as in the comparative example) and Resin 1/Oligomer A mixtures were dissolved in a mixture of water and ethanol. The other mixtures were dissolved in ethanol although some of those containing furfuryl alcohol had a sufficiently low viscosity that no solvent was required. The resin concentrations in solvent were adjusted to give a coating weight of resin on the bottle of 10 g/m$^2$. Generally a concentration of about 50 weight % was required.

A large number of bottles were sulphonated and coated with resin described in the comparative example. Various mixtures of the above resins and oligomers were used as shown in Table 1. The permeability quoted in table 1 were calculated from the rate of weight loss from the bottles after they had been on test at 40° C. for 6 months. In fact this permeability did not change substantially after the first month.

Resin 2 was somewhat more resistant to cracking in dry xylene than resin 1 but in the inevitable areas where the resin was thicker than average it did invariably crack.

The samples where 100 weight % oligomer was used were more difficult to prepare because of the problem of getting an even coating of the desired thickness although low permeabilities can be obtained. A resin oligomer ratio of 25:75 gives satisfactory results and is easily applied to the sulphonated surface.

EXAMPLE 3

A number of bottles were treated as described in example 1 and tested in the same way at 40° C. except that the bottles were filled with a range of different solvents. The permeability was again calculated after the bottles had been on test for 6 months.

With few exceptions the sulphonation/resin coating treatment provides a satisfactorily low permeability to all the solvents tested. The full results are shown in table 2.

EXAMPLE 4

Two types of 25 l. drum were obtained from Van Leer (UK) Ltd.:
(a) a conventional blow moulded drum
(b) a drum fabricated from extruded tube and injection moulded ends.

One drum of each was sulphonated by passing 100 liters of dry nitrogen through the drum to remove all moist air. 100 liters of a mixture of sulphur trioxide (15 weight %) and dry nitrogen (85 weight %) was then passed through the drum. The gas flow was stopped for 2 minutes to allow the sulphur trioxide to react with the polyethylene before blown out of the drum with nitrogen. Ammonia gas was passed into the drum to neutralise the surface of the drum and this was blown out with air. Finally the drums were washed and dried.

Two more drums of type (b) were sulphonated as above except that the use of ammonia was omitted. After washing and drying, the drums were coated by pouring in about 1 liter of resin mixture as used in example 1. The drum was rotated to ensure that the whole of the internal surface was covered and excess resin was removed. The drums were heated to 80° C. for 15 minutes to cure the resin.

The drum (including one of each type which had not been treated) were sealed and weighed at intervals. After a few weeks the rate of weight loss from the drums remained fairly constant and the results are recorded in table 3.

The permeability of the blow moulded drum was reduced to zero by sulphonation/neutralisation whereas the fabricated drum was still permeable, albeit at a much lower rate. With the sulphonation/resin treatment the fabricated drums had very low permeabilities even if water was added to the xylene.

EXAMPLE 5

Further examples of 25 liter fabricated drums were sulphonated and either neutralised with ammonia or coated with resin as described in example 4. 200 liter fabricated drums were treated in the same way although, obviously, larger quantities of materials were required, and the resin was cured by blowing hot air into the drums.

Discs of 80 mm diameter were cut from the extruded bodies and ends of the drums and the permeability measured by placing the disc in a permeability cell with xylene on the treated side of the disc. On the other side of the disc a carrier gas flowed through constantly. At intervals this gas stream was analised by gas chromatography and the concentration of xylene determined. The permeability in $g/m^2/day$ was calculated and the results are shown in table 4.

The sulphonated/neutralised bodies had a very low permeability to xylene when dry but higher when wet. The permeability of the injection moulded ends was fairly high whether the xylene was dry or wet. On the other hand if the drum was sulphonated and resin coated both ends and bodies had a very low permeability to both wet and dry xylene.

EXAMPLE 6

Samples cut from an extruded body and an injecton moulded end of a 200 liter fabricated drum were hung inside a 25 liter drum. The drum was sulphonated by following the procedure described in example 4. Some samples were neutralised with ammonia gas and others were coated by dipping in the resin described in example 1, and curing at 80° C.

The treated samples were immersed in engine oil and xylene, with and without 1 weight % water added. The samples in the appropriate medium were stored at 20°, 40°, or 60° C. and were removed and weighed at intervals. For comparison untreated samples were tested in the same way.

FIGS. 5–8 show how the weight of the various samples from the end of the drum increased with time. Similar results were obtained from samples from the body of the drum. In all cases the sulphonated/resin coated samples absorbed the oil or xylene at a lower rate than the sulphonated/neutralised samples. The samples in xylene ultimately reach the same saturation level as the untreated samples. Surprisingly, with oil, the saturation level as well as the rate of absorption is reduced by the treatment.

Some further samples were not sulphonated but merely coated with resin as above. In order to get a satisfactory coating it was necessary to immerse the polyethylene samples in chromic acid solution. This does not affect the barrier afforded by the resin but merely increases the surface energy of the polyethylene so that a satisfactory coating can be obtained. These samples had a much higher rate of absorption than those which had been sulphonated and resin coated.

EXAMPLE 7

Several 200 liter drums were fabricated and resin coated as described in example 4. They were filled with xylene or oil and stored at ambient temperature. After 1 month and 3 months a drum was emptied and the Youngs modulus (tensile stress/strain at low levels of strain) determined. For comparison similar tests were done with untreated drums. The results are shown in table 5.

The modulus of the ends appears to increase when they are sulphonated and resin coated. However, of greater importance is the sulphonated and resin coated. However, of greater importance is the dramatic reduction in the modulus of untreated polyethylene in the presence of xylene and to a lesser extent by oil. This reduction is prevented if the drum is sulphonated.

It was observed during this test that the untreated drums containing xylene panelled after only a few days whereas the sulphonated/resin coated samples were satisfactory after many months.

EXAMPLE 8

To demonstrate that the sulphonation/resin coating process enabled drums to be cleaned by conventional drum cleaning processes and reused satisfactorily further drums were treated as described in example 7 and filled with xylene or oil. For comparison untreated polyethylene drums and steel drums were also filled with oil and xylene.

After 1 month and 3 months the drums were emptied and cleaned by washing the inside of the drum with 7 weight % aqueous sodium hydroxide at 80° C., followed by rinsing with water and drying. This cleaning process was carried out on a commercial plant.

The clean drums were filled with heptane and this was tested at intervals for contamination by the original contents of the drum. After 1 or 2 weeks little change in the degree of contamination was observed. Table 6 shows the levels of contamination recorded after this time. The drums which had been sulphonated/resin coated produced similar results to steel drums whereas with untreated polyethylene drums contamination was much higher.

These examples serve to demonstrate that the objectives referred to earlier can be achieved by this invention. It is also noted that a by-product of sulphonation is a dark brown surface which can be aestheticly unpleasant. If a pigment or dye is added to the resin the brown surface can be hidden by one of a choice of colours.

TABLE 1

Permeability of polyethylene bottles to xylene at 40° C.
(g mm/m²/day)

| Resin:Oligomer ratio | Wet/Dry | UFA1 TSF2 | UFA1 Furfuryl Alcohol | TCS39 TSF2 | TCS39 D442 | TCS39 Furfuryl Alcohol |
|---|---|---|---|---|---|---|
| 100:0 | Dry | (a) | | (b) | | |
|  | Wet | 1.1 | | 2.1 | | |
| 50:50 | Dry | (a) | (a) | 0.1 | 0.1 | 2.2 |
|  | Wet | 3.6 | 0.4 | 0.7 | 1.0 | 0.6 |
| 25:75 | Dry | 0.2 | 0.1 | 0.1 | 0.1 | 0.2 |
|  | Wet | 1.7 | 0.9 | 2.0 | 0.7 | 0.9 |
| 12½:87½ | Dry | — | 0.4 | 0.1 | 0.1 | 0.4 |
|  | Wet | — | 0.6 | 0.8 | 1.4 | 0.9 |
| 0:100 | Dry | 0.3 | 0.4 | 0.3 | 0.1 | 0.4 |
|  | Wet | 3.1 | 5.0 | 3.1 | 6.2 | 5.0 |

Results after approximately 6 months testing.
(a) Resin cracks in less than 3 months.
(b) Resin cracks in thick sections.
Permeability of untreated bottle = 95 g.mm/m²/day

TABLE 2

Permeability (g.mm/m²/day) of polyethylene bottles to different solvents at 40° C.

| Treatment | Untreated | SO$_3$/NH$_3$ | | SO$_3$/Resin | |
|---|---|---|---|---|---|
| Solvent | Dry | Dry | Wet | Dry | Wet |
| Xylene | 95 | 0.4 | 25 | 0.41 | 2.5 |
| Heptane | 69 | 0.6 | 3.2 | 0.1 | 0.3 |
| White Spirit | 29 | 0.6 | —' | 0.02 | 0.24 |
| Carbon Tetrachloride | 148 | 0.6 | —' | 0.66 | 7.5 |
| Cyclohexanone | 1.9 | 0.1 | —' | 0.00 | 0.43 |
| Ethyl Acetate | 8.5 | 0.14 | 0.71 | 0.01 | 1.15 |
| Iso Propanol | 0.15 | 0.11 | 0.16 | 0.16 | 0.18 |
| Paraffin | 14.5 | 0.1 | —' | 0.00 | 0.16 |
| Butanone | 8.4 | 0.4 | —' | 0.13 | 5.2 |

Results after approximately 6 months on test.
'Test has not been carried out.

TABLE 3

Weight loss of xylene from type (b) 25 l. drums at 20° C.

| Drum Type | Treatment | Permeability (g/day) |
|---|---|---|
| A conventional | Untreated | 5.0 |
| blow moulded drum | Sulphonated/Neutralised | 0.0 |
| A drum fabricated | Untreated | 9.4 |
| from extruded tube | Sulphonated/Neutralized | 2.2 |
| and injection | Sulphonated/Resin Coated | 0.0 |
| moulded ends | Sulphonated/Resin Coated* | 0.0 |

Resin used was UFA1/TSF2 (25:75)
Result after 6 months testing.
*Drum filled with wet xylene. All other drums filled with dry xylene.

TABLE 4

PERMEABILITY OF SAMPLES CUT FROM TYPE (b) DRUMS TO XYLENE (g/m²/day)

| Temperature of test | Drum Size | Treatment | End Dry | End Wet | Body Dry | Body Wet |
|---|---|---|---|---|---|---|
| 25° C. | 25 liter | Untreated | 30 | 30 | 30 | 30 |
|  |  | SO$_3$/NH3 | 8.0 | — | 0.8 | 4.8 |
| 40° C. | 25 liter | Untreated | 99 | 99 | 160 | 160 |
|  |  | SO$_3$/NH3 | 32 | 26 | 1.5 | 16.4 |
|  |  | SO$_3$/Resin 1 | 0.5 | 0.5 | 1.0 | 0.8 |
|  | 200 liter | Untreated | 33 | 33 | 48 | 48 |
|  |  | SO$_3$/Resin 1 | 0.1 | 0.2 | 0.1 | 1.0 |
|  |  | SO$_3$/Resin 2 | 0.1 | 0.2 | 0.3 | 0.6 |

All results after 6 months of test
Resin 1 = UFA1/TSF 2 (25/75)
Resin 2 = TCS39/TSF2 (25/75) 25 liter — 1.3 mm ends and bodies 200 liter — 3.0 mm bodies, 5 mm ends.

TABLE 5

Young's modulus of polyethylene cut from type (b) 200 liter drums after storage of solvent

| Sample Type | Product | Treatment | Tensile Modulus (MPa) 1 month | Tensile Modulus (MPa) 3 months |
|---|---|---|---|---|
| Ends | None | Untreated | 1212 | 1212 |
|  | Xylene | Untreated | 1028 | 868 |
|  |  | SO$_3$Resin | 1284 | 1269 |
|  | Oil | Untreated | 1245 | 1294 |
|  |  | SO$_3$/Resin | 1268 | 1218 |
| Bodies | None | Untreated | 1064 | 1064 |
|  | Xylene | Untreated | 710 | 529 |
|  |  | SO$_3$/Resin | 1071 | 1075 |
|  | Oil | Untreated | 1020 | 989 |
|  |  | SO$_3$/Resin | 1036 | 1065 |

Resin used was UFA1/TSF2 (25:75)

TABLE 6

Contamination of heptane (ppm) stored in cleaned 200 liter drums previously used for oil or xylene.

| Product | Storage time | Steel | Type (b) drum Sulphonated | Type (b) drum Untreated |
|---|---|---|---|---|
| Oil | 1 month | 40 | 10 | 130 |
|  | 3 months | — | 20 | 150 |
| Xylene | 1 month | 250 | 200 | 800 |
|  | 3 months | — | 100 | 850 |

I claim:

1. An enclosure member consisting essentially of solid, non-aromatic polymers that have a linear carbon to carbon backbone structure and have a plurality of free hydrogen atoms attached to the carbon atoms with a permeability to wet and dry solvents and fuels of less than 1/50 of the permeability of untreated enclosure members having a thickness of 1 mm, the enclosure having an inner and outer surface having a portion of the hydrogen atoms replaced by sulphonic acid or sulphonate groups and being coated with a cured thin layer having a thickness of at least 2 micrometers of a mixture of 90 to 0 weight % of a resin made by the reaction of urea and formaldehyde in a molar ratio of from 1:1,1 to 1,7, respectively of melamine and formaldehyde in a molar ratio of from 1:1,2 to 1:4,0 with 10 to 70 weight % of furfuryl alcohol added during the reaction and 10–100 weight % of an oligomer consisting of a polymer of furfuryl alcohol and 0 to 100 mole %—calculated on the furfuryl alcohol—of formaldehyde with a degree of polymerisation between 1 and 10.

2. An enclosure member according to claim 1, wherein the said solid, non-aromatic polymer is polyethylene.

3. A proces for rendering substantially impermeable to the transmission of wet or dry solvents, fuels, vapours and gases an enclosure member consisting of solid non-aromatic polymers which have a linear carbon to carbon backbone structure and have a plurality of free hydrogen atoms attached to the carbon atoms, which process comprises treating the inner and/or outer surfaces of the enclosure member with sulphur trioxide, removing the excess of sulphur trioxide with a stream of dry air followed by washing with an aqueous solution, then applying a layer of a dispersion or solution of a mixture of 90 to 0 weight % of a resin made by the reaction of urea and formaldehyde in a molar ratio of from 1:1,1 to 1:1,7 respectively of melamine and formaldehyde in a molar ratio of from 1:1,2 to 1:4,0 with 10 to 70 weight % furfuryl alcohol added during the reaction and 10-100 weight % of an oligomer consisting of a polymer of furfuryl alcohol and 0 to 100 mol %—calculated on the furfuryl alcohol—of formaldehyde with a degree of polymerisation between 1 and 10.

4. A process according to claim 3 characterised in that the said enclosure member consists of polyethylene.

5. An enclosure member according to claim 1, wherein said permeability is less than 1/200.

* * * * *